Feb. 24, 1948. G. H. KRISOR 2,436,651
REGULATOR FOR GAS BURNING HEATERS FOR LIQUIDS
Filed Jan. 22, 1946 2 Sheets-Sheet 1
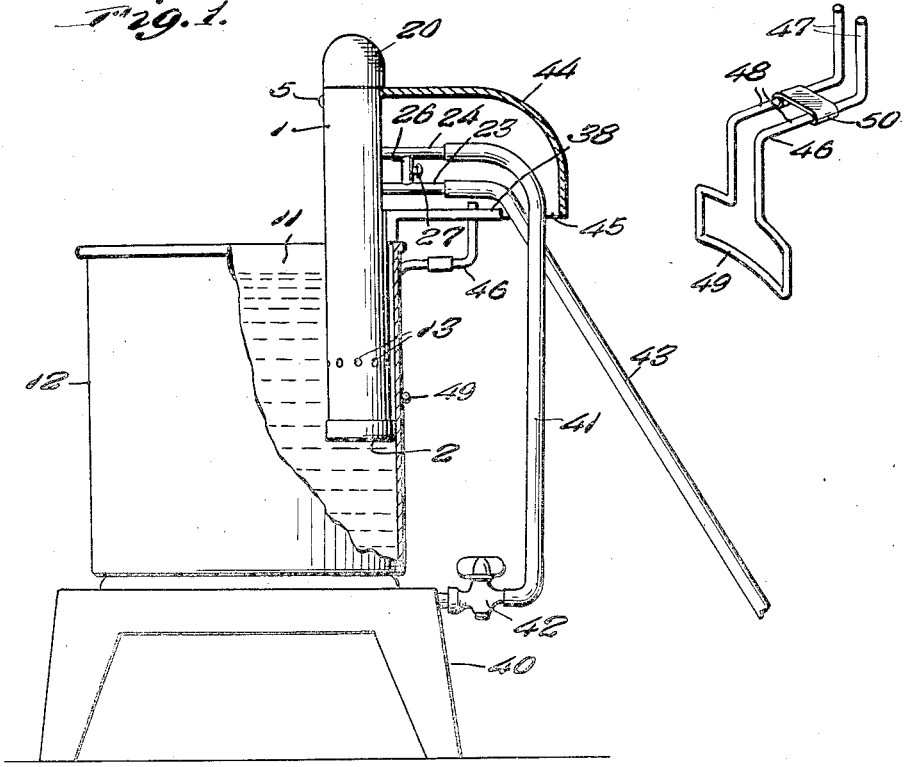
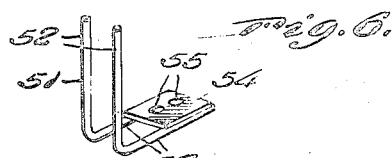

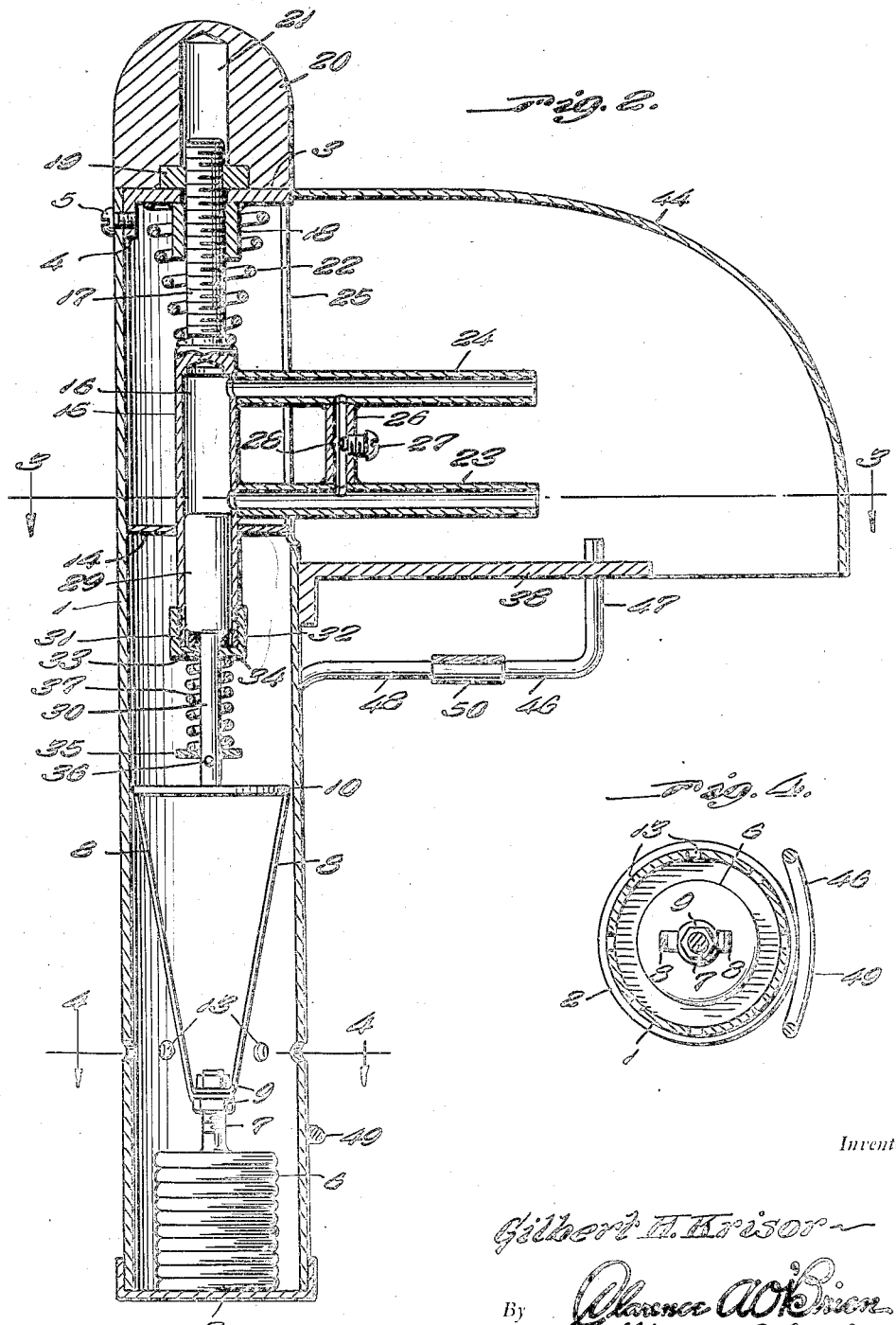

Patented Feb. 24, 1948

2,436,651

UNITED STATES PATENT OFFICE 2,436,651

REGULATOR FOR GAS-BURNING HEATERS FOR LIQUIDS

Gilbert H. Krisor, Evanston, Ill., assignor of one-half to David A. Kuhlin, Chicago, Ill.

Application January 22, 1946, Serial No. 642,696

4 Claims. (Cl. 236—32)

This invention relates to new and useful improvements and structural refinements in regulators for gas burning heaters, and although the general scope of this device may be expanded to heaters of various types and applications, the present invention applies particularly to gas burning heaters such as are used for the processing of acrylic, softening of hydro-colloid, compounds, etc., in the dental profession.

The principal object of the invention is to provide a device of the character herein described, by means of which the liquid being heated will be automatically and accurately maintained at a predetermined degree of temperature.

A further object of the invention is to provide a regulator which may be simply and conveniently attached to the receptacle in which the liquid is being heated and which may be universally applied to all types of gas burning devices.

Another object of the invention is to provide a regulator which is of simple construction and which, when once adjusted, will operate for considerable periods of time without attention.

An additional object of the invention is to provide a regulator which may be readily disassembled for purposes of cleaning, inspection, or repair.

With the above more important objects in view, and such other objects as may become apparent as this specification proceeds, the invention consists essentially of the arrangement and construction of parts as illustrated in the accompanying drawings, in which:

Figure 1 is a side elevation of the invention, showing the same connected to a heater and in position in the liquid which is being heated.

Figure 2 is a central, cross-sectional view, illustrating the regulator per se.

Figure 3 is a cross-sectional view taken in the plane of the line 3—3 in Figure 2.

Figure 4 is a cross-sectional view taken in the plane of the line 4—4 in Figure 2.

Figure 5 is a perspective view illustrating a bracket such as may be used for attaching the regulator to the receptacle, and Figure 6 illustrates a perspective view of a modified form of the bracket, such as may be used for attaching the regulator to a work bench.

Like characters of reference are used to designate like parts in the specification and throughout the several views.

Referring now the accompanying drawings in detail, the invention consists of an elongated, vertically disposed casing 1, provided at the lower end thereof with a flanged cover 2 and closed at the upper end by means of a flat plate 3. The latter is provided with a downturned lug 4, whereby it is secured to the side wall of the casing 1 by means of a suitable bolt 5.

Positioned in the lower end of the casing upon the cover 2 is a thermostat 6, the upper end of which is provided with an upstanding, screw threaded stud 7. A pair of divergent extension arms 8 are secured at their lower ends to the stud 7 by means of a pair of lock nuts 9, the arms extending upwardly and outwardly as is best illustrated in the accompanying Figure 2. A circular pressure plate 10 is secured to the upper extremities of the arms 8, the purpose of this plate being hereinafter more fully described.

The lower end of the casing 1 is adapted for insertion into the liquid 11 which is being heated in a receptacle 12, and the casing is provided with a plurality of circulating apertures or openings 13 in order that the thermostat 6 may be actually immersed in the liquid.

Positioned in the casing 1 medially of its length, is a bearing plate 14 provided with a central aperture in which a valve body 15 is freely slidable. The later is of a substantially cylindrical configuration and is formed with a cylindrical chamber 16, as is best illustrated in the accompanying Figure 2.

The upper end of the body 15 is formed with a screw threaded shank 17 which is freely slidable in a bearing block 18, secured to the underside of the plate 3. The shank protrudes through the upper end of the casing 1 and engages a nut 19, the latter being imbedded in one end of an adjusting knob 20. This knob is also provided with a blind, axially extending bore 21 which is adapted to receive the projecting end of the shank 17.

A compression spring 22 is interposed between the upper end of the body 15 and the underside of the plate 3, whereby the knob 20 and the associated nut 19 will be urged against the upper end of the casing 1.

Mounted upon the body 15 and communicating with the chamber 16 medially the length thereof, is a gas inlet duct 23 and a gas outlet duct 24 enters the chamber adjacent to its upper end. These ducts protrude through a slot 25 formed in the side wall of the casing 1 and a by-pass 26 connects the two ducts on the outside of the casing, as will be clearly apparent from the accompanying drawings. This by-pass is provided with an adjusting screw 27, the pointed shank of which is engageable with a seat 28 formed in the by-pass wall.

Positioned in the lower end of the chamber 16 is a slidable piston 29, the same being provided with a piston stem 30. The lower end of the body 15 is externally threaded as indicated by the reference numeral 31 to receive an internally threaded cap 32. The latter is formed with a central aperture or passage 33 through which the stem 30 may freely pass and a packing gland 34 is positioned between the piston and the cap to prevent leakage around the stem.

Adjacent the lower extremity of the stem 30 is a flat washer 35 which is retained thereon by means of a transversely extending pin 36 and a compression spring 37 is interposed between the cap 32 and the washer 35 to urge the lower end of the stem 30 against the aforementioned pressure plate 10.

Projecting outwardly from the side of casing 1 is a mounting platform 38, provided with a pair of apertures 39.

The receptacle 12 is usually positioned upon the burner of the heater 40, the latter being connected by means of a suitable tube 41 to the aforementioned outlet duct 24 and a suitable valve or petcock 42 being provided to control generally the operation of the heater. A further tube 43 connects the inlet duct 23 with a source of gas supply and a housing or an enclosure 44 is removably snapped into position on the platform 38 to inclose the ducts and portions of the tubes associated therewith.

The enclosure 44 is provided with a suitable opening 45 through which the tubes 41 and 43 may freely pass.

The regulator may be mounted directly upon the receptacle 12 by means of a bracket designated by the general reference numeral 46 which is illustrated in the accompanying Figure 5. This bracket consists of a pair of parallel prongs 47, angulated at the lower ends thereof to form the portions 48, which in turn, are bent downwardly to form a resilient clamp 49, configurated essentially as shown in the accompanying drawings. The portions 48 are reinforced by a transversely extending web 50 and the entire bracket may be formed integrally from one piece of wire rod. The upper ends of the prongs 47 are removably insertable into the aforementioned aperture 39 in the platform 38, and the resilient clamp 49 is adapted to cooperate with the casing 1 in clamping the regulator to the side wall of the receptacle 12.

Alternatively, the regulator may be attached to a suitable work bench by substituting a bracket 51 for the bracket 46, the modified bracket being illustrated in the accompanying Figure 6. The bracket 51 consists of a pair of prongs 52, similar to the aforementioned prongs 47 and are removably insertable into the apertures 39. The prongs 52 are angulated at the lower ends thereof to form the portions 53, and a mounting plate 54 is secured to these portions as will be clearly apparent from the accompanying drawings. This plate is provided with a pair of suitable apertures 55 whereby the bracket and the regulator associated therewith may be attached to a work bench by means of suitable bolts.

Having thus described the construction of the invention, its method of operation will now be presented.

Assuming the regulator to be attached and connected as illustrated in the accompanying Figure 1, the knob 20 is rotated (in the anti-clockwise direction) until the spring 22 is fully extended and the knob turns freely. During this operation the piston 29 will remain stationary and the housing 15 will travel downwardly against the resiliency of the spring 37 until the piston completely covers the inlet duct 23.

The petcock 42 should now be opened and the burner of the heater 40 lighted, whereupon the screw 27 is adjusted so that the gas will flow from the duct 23 and through the by-pass 26 and the duct 24 to the burner at a minimum rate such as is necessary in order to maintain the burner in operation.

The knob 20 should now be turned (in the clockwise direction) to raise the body 15 and the inlet duct 23 associated therewith above the level of the piston 29. The gas will now pass from the duct 23 and through the chamber 16 and the duct 24 to the burner, and the latter will burn fully.

The temperature of the liquid 11 should now be checked by means of a conventional thermometer, and the rise in temperature of the liquid will be accompanied by a corresponding expansion of the thermostat 6. This expansion will be transmitted through the extension arms 8 and the stem 30 to the piston 29 and the latter will be forced upwardly until a certain degree of temperature has been reached and the piston has again covered the inlet duct 23.

At this point, the flame in the burner will again be reduced to the minimum rate of flow as permitted by the by-pass 26 and it will be observed that by turning the knob 20 to raise or to lower the body 15, the degree of temperature at which the regulator will reduce the flame to a minimum may be increased or decreased respectively.

After the flame in the burner has been operating at a minimum, the temperature of the liquid will decrease and simultaneously, the thermostat 6 will contract until the piston 29 again uncovers the inlet duct 23. Thereupon, the cycle of operation as above set forth will be repeated and it will be observed that once the adjustment of the knob 20 is made to correspond to a predetermined degree of temperature, the regulator will continue to function automatically and accurately to maintain the temperature of the liquid within very close limits of variation with respect to that degree of temperature.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

1. A regulator for gas burning heaters for liquids, comprising, in combination, an elongated, vertically disposed casing closed at the ends thereof, a thermostat in the lower end of said casing, said lower end being adapted for immersion into said liquid and having a plurality of liquid circulating openings formed therein, a plurality of divergent arms connected to the upper end of said thermostat, a pressure plate at the upper extremities of said arms, a bearing plate in said casing medially the length thereof, a valve body slidable in said bearing plate, the upper end of said casing having an aperture formed centrally therein, a screw threaded shank secured to the upper end of said body and projecting through said aperture, a rotatable adjusting knob, an internally threaded portion on said knob, said internally threaded portion engaging the projecting end of said shank, a compression spring between said body and the upper end of said casing, a cylindrical chamber in said body, a gas inlet duct medially the length of said chamber, a gas outlet duct adjacent the upper end of said chamber and in communication with said heater, an adjustable by-pass connecting said ducts, a piston slidable in the lower end of said chamber, a stem connected to said piston and protruding through the lower end of said body, and resilient means for urging the lower end of said stem against said pressure plate.

2. The device as defined in claim 1 in which said means comprises, in combination, a cap formed with a central aperture at the lower end of said body, said stem projecting through said aperture, a washer positioned on said stem, and a compression spring between said washer and said cap.

3. In association with the device as defined in claim 1, means for attaching said casing to a receptacle containing said liquid.

4. The device as defined in claim 1 together with a bracket provided on said casing and formed with a pair of apertures, and a wire rod angulated to provide a resilient clamp and a pair of prongs, said prongs being removably receivable in said apertures and said clamp being engageable with said casing.

GILBERT H. KRISOR.

REFERENCES CITED

The following references are of record in the file of this patent:

UNITED STATES PATENTS

| Number | Name | Date |
|---|---|---|
| 575,042 | Rowe | Jan. 12, 1897 |
| 856,815 | Seward | June 11, 1907 |
| 926,194 | Junkers | June 29, 1909 |

FOREIGN PATENTS

| Number | Country | Date |
|---|---|---|
| 69,447 | Switzerland | July 6, 1914 |